Figure 1:
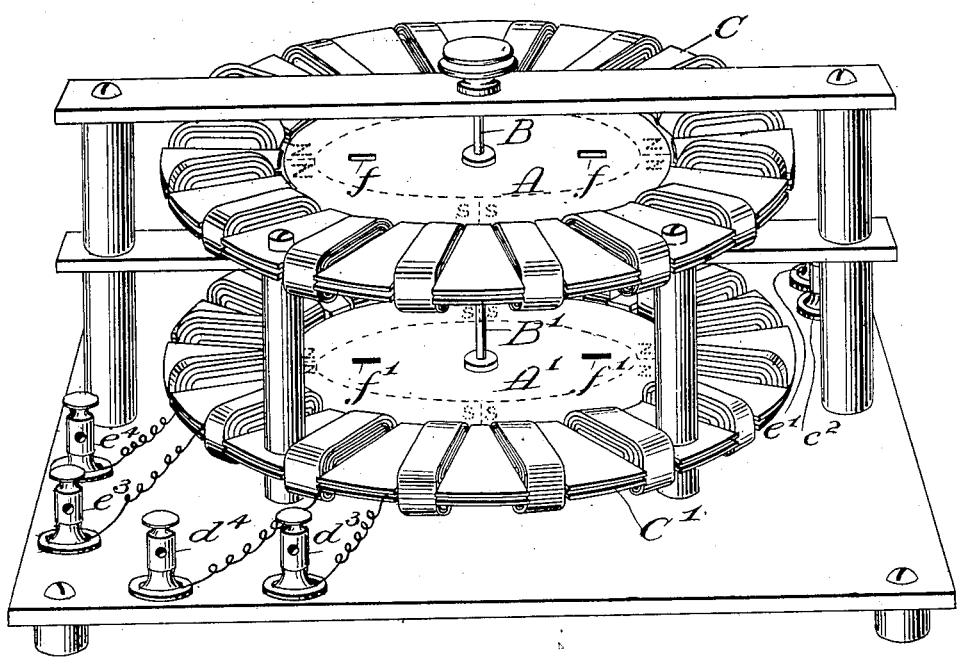

No. 660,268. Patented Oct. 23, 1900.
C. L. CLARKE.
INDICATOR.
(Application filed Jan. 17, 1900.)

(No Model.) 3 Sheets—Sheet 1.

WITNESSES:
George T. Hackley.
Alfred Meldon.

INVENTOR
Charles L. Clarke.
BY
R. C. Mitchell,
ATTORNEY

No. 660,268. Patented Oct. 23, 1900.
C. L. CLARKE.
INDICATOR.
(Application filed Jan. 17, 1900.)

(No Model.) 3 Sheets—Sheet 2.

WITNESSES:
George T. Hackley.
Alfred Meldon.

INVENTOR
Charles L. Clarke.
BY
ATTORNEY

No. 660,268. Patented Oct. 23, 1900.
C. L. CLARKE.
INDICATOR.
(Application filed Jan. 17, 1900.)

(No Model.) 3 Sheets—Sheet 3.

WITNESSES:
George T. Stackly
Alfred Meldon

INVENTOR
Charles L. Clarke.
BY
R. C. Mitchell.
ATTORNEY

UNITED STATES PATENT OFFICE.

CHARLES L. CLARKE, OF MOUNT VERNON, NEW YORK.

INDICATOR.

SPECIFICATION forming part of Letters Patent No. 660,268, dated October 23, 1900.

Application filed January 17, 1900. Serial No. 1,717. (No model.)

*To all whom it may concern:*

Be it known that I, CHARLES L. CLARKE, a citizen of the United States, residing at Mount Vernon, Westchester county, New York, have invented certain new and useful Improvements in Indicators, of which the following is a full, clear, and exact description.

My invention relates to indicators for use in connection with alternating-current apparatus, and has for its object to produce an apparatus which shall indicate certain phase and frequency relations in alternating-current systems.

It consists of the combination, in an indicating device, of alternating-current motors, preferably of the synchronous type, with other devices operating to give certain indications from which phase relations and frequency relations can be determined, and therefrom also certain relations of apparatus. As just stated, synchronous motors are preferable; but in certain instances and for certain purposes induction-motors might be employed in apparatus embodying my invention and give sufficiently accurate results and attain sufficiently some of the objects thereof. The phase and frequency relations which may be indicated with my apparatus are those of electromotive forces, or of currents, or of electromotive forces and currents, or of an electromotive force and a current. The apparatus is capable of several useful applications, perhaps the most useful application to which I have applied it being the indication of the phase and certain frequency relations of the electromotive forces of a multiphase system with the electromotive forces of an incoming multiphase dynamo, to which application I shall again refer herein and more fully describe. The invention with modified apparatus may be used in a similar manner with single-phase systems, as will be obvious from the following description.

It is well-known that great difficulty is experienced in connecting an additional single-phase or multiphase dynamo with a multiple-arc system with which another or other similar dynamos in operation are already connected, and that in order not to run the risk of producing injurious mechanical strains upon the machinery an incoming dynamo should be connected in only when it is running substantially in synchronism with the other dynamos—that is to say, when the polar speed of the incoming dynamo is substantially the same as the polar speed of said other dynamos, and that in order not to produce undesirable electrical fluctuations in the system such connection should be made only when the phase difference between the electromotive force or forces of the incoming dynamo and the electromotive forces of the other dynamos already in the system is not too great from opposition. My apparatus can be used to give positive indications of when two alternating-current dynamos are running in synchronism and nearly in synchronism, irrespective of the phase relations of their electromotive forces or currents, of the phase relations of their respective electromotive forces when they are running in synchronism, and also when they are not running in synchronism, but nearly so, which of the two dynamos is running the faster or has the greater polar speed. My apparatus can also be used to give various other indications.

My invention is illustrated in the accompanying drawings, in which—

Figure 2:
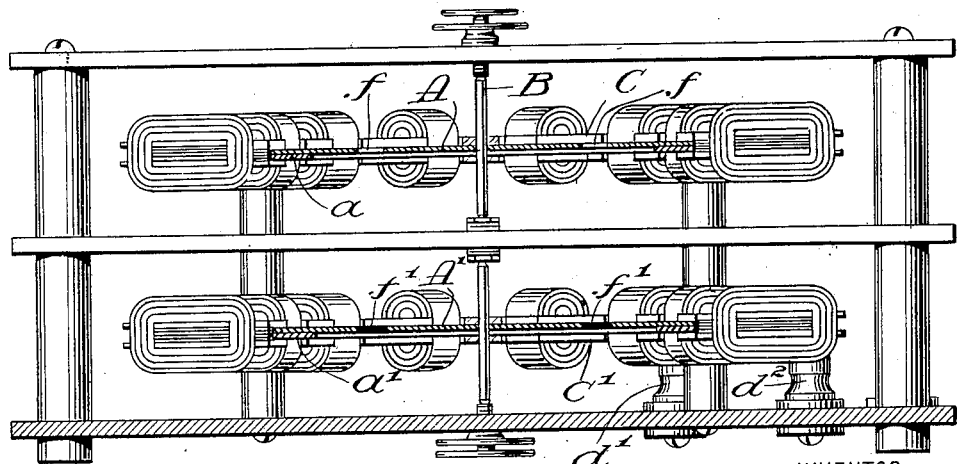
Figure 3:
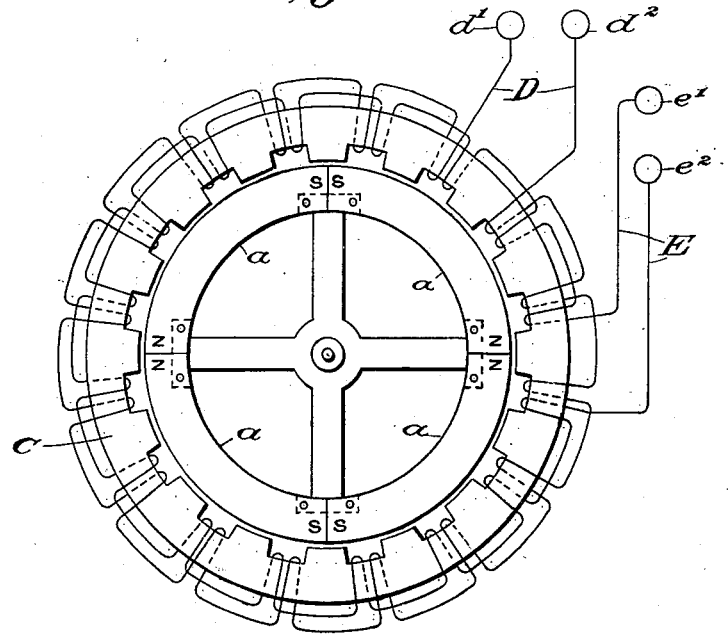
Figure 4:
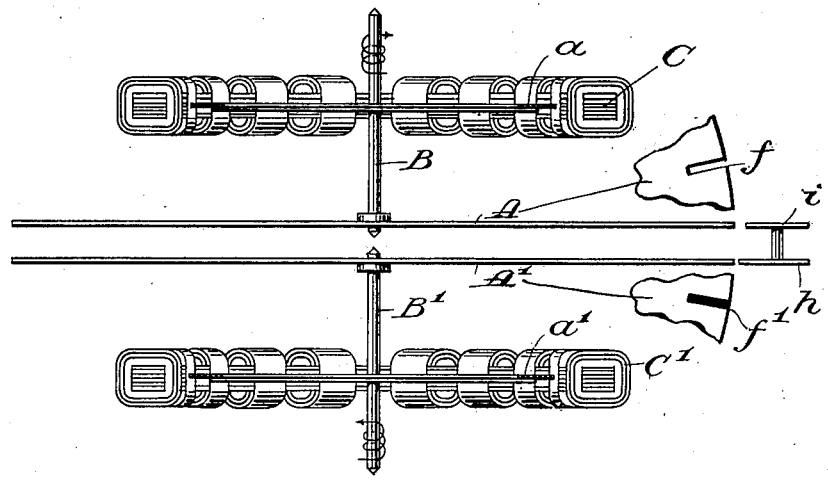
Figure 5:
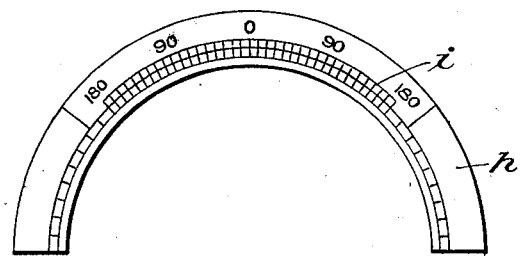
Figure 6:
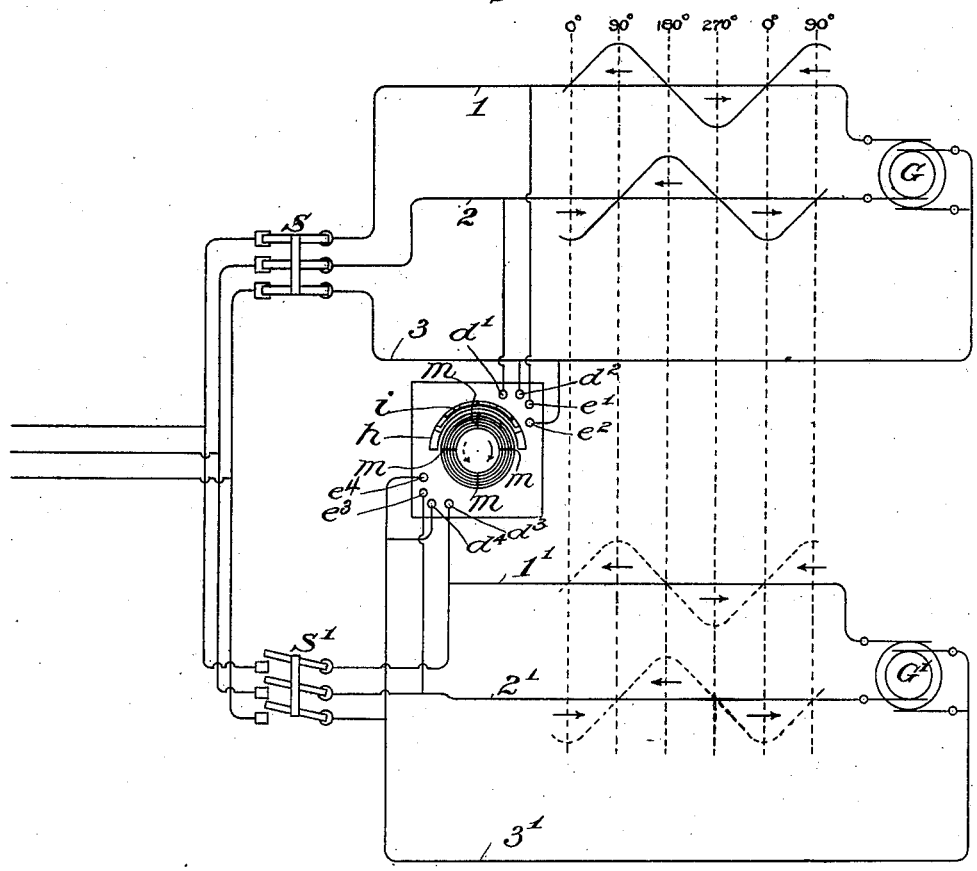

Figure 1 represents a perspective view thereof. Fig. 2 represents a side elevation, partly in section. Fig. 3 represents in diagram the circuits for one of the field-magnets and one form of armature that may be used. Fig. 4 represents the apparatus in a modified form. Fig. 5 represents in reduced dimensions a scale which may be used as a part of the apparatus. Fig. 6 represents the apparatus in circuit with a two-phase generator supplying working mains and with another incoming two-phase generator.

Referring more particularly to the drawings, which show one embodiment of my invention, A B C and A' B' C' represent a pair of two-phase motor devices, each with the same number of poles—in this case four—in which A A' are two stroboscopic disks separately mounted on rotatable shafts B B', which also carry armatures $a$ $a'$, preferably polarized, and necessarily so if the apparatus is intended to indicate phase relations, said armatures being intended to rotate in opposite directions to one another.

C C' are two field-magnets, each of which has two sets of windings corresponding to the windings D and E, Fig. 3, and connected, respectively, to binding-posts $d'$ $d^2$ $e'$ $e^2$ $d^3$ $d^4$ $e^3$ $e^4$. In the apparatus shown the armatures $a$ $a'$ have alternately north and south poles at N N and S S, respectively, and the windings upon the two field-magnets C C' are disposed in such a manner that when two-phase currents are passed through the conductors upon either of the said field-magnets four progressing alternately north and south poles are produced, which cause the armature within to revolve.

In the disk A, which is preferably black, are two opposite slots $f\,f$, and for convenience I call said disk the "shutter-disk." Upon the disk A', which is preferably white, are two opposite spots or objects $f'\,f'$, preferably black, and for convenience I call the latter disk the "target-disk," and said slots and spots are otherwise so disposed upon their respective disks that when said disks are rotating in opposite directions upon looking directly down the spots will be periodically visible through the slots.

In Fig. 4 I show a slightly-modified form of apparatus in which the stroboscopic disks A A' are attached to the rotatable shafts B B', so as to be closer together, and are extended in diameter beyond the motors, and the slots $f\,f$ and spots $f'\,f'$ of said disks, respectively, are moved to the peripheries of the same, as indicated. From this arrangement it will be seen, the disks being closer together, that there is less possibility of parallax in viewing the spots through the slots and that a closer and therefore clearer view of the spots is had, that a better view of any scale used in this modified form of apparatus will be obtained, because the whole of it is seen directly and no part of it has to be viewed through the slots of the shutter-disk, as would be the case with a scale used with the form of disk shown in Fig. 1, and, furthermore, that the increased diameter of the disks calls for a more open scale, and therefore one capable of giving closer readings.

In connection with this embodiment I have shown a scale which I have invented in order to facilitate the interpretations of the reading of the instrument and avoid parallactic error in such reading. It is shown in cross-section in Fig. 4 and in horizontal projection in Fig. 5. It consists of a half-circumference scale $h$, preferably in the same plane as the target-disk A', and above said scale and centrally fixed to it a quarter-circumference scale $i$, preferably in the same plane as the shutter-disk A and having division-marks directly above corresponding division-marks on the scale $h$. In reading the indications of the apparatus as shown by the scale just described the latter should be so viewed that corresponding divisions on the two scales are seen in line. It is evident that a similar scale may be used in my apparatus as it is shown in Fig. 1, only in this case the scales $h$ and $i$ cannot lie in the same planes as the target and shutter disks, respectively, but may lie a little above said disks, when the lower scale $h$ would have to be viewed through the slots in the shutter-disk. In the scale just described the central lines on $h$ and $i$ are the zero-line, and the extreme limits of the scale $h$ represent three hundred and sixty degrees on either side of said zero-line, while the extreme limits of the scale $i$ represent one hundred and eighty degrees on either side of the zero-line.

It will thus be seen from the foregoing description of my apparatus that, broadly speaking, there is in its embodiment as shown in the drawings a pair of two-phase alternating-current motors adapted to operate synchronously, combined one with a stroboscopic target-disk, or means for rotating spots or objects, and the other with a stroboscopic shutter-disk, or means for rendering the spots or objects on said target-disk periodically visible, the two disks constituting one form of stroboscopic system and being one well-known means for producing stroboscopic images.

I will now describe the manner in which said apparatus indicates when two two-phase generators are in synchronism or nearly so and when in synchronism, then how the apparatus indicates the phase relations between the electromotive forces of said generators, thereby serving as an indicator of when the conditions are proper for a two-phase incoming generator to be connected with another two-phase generator already in circuit in a two-phase multiple-arc system. In this connection I refer to Fig. 6 of the drawings, which represents two such generators, each having two outgoing conductors and the ordinary common return conductor and a switch for connecting each generator in multiple arc with a work-circuit and thus connecting it with the other generator. In said Fig. 6, G represents the generator, having outgoing conductors 1 2 and a common return-conductor 3 and already connected with the work-circuit by means of the switch S. G' represents the incoming generator, with outgoing conductors 1' 2' and a common return-conductor 3' and a switch S' for connecting said conductors and generator with the work-circuit and generator G. The electromotive forces set up in the conductors 1 1' by the generators G G', respectively, are assumed to be the leading electromotive forces of said generators, as indicated by the alternating-electromotive-force diagrams drawn on the outgoing conductors. Let it be assumed that the terminals of the motor, which drives the shutter-disk A of my apparatus before described and which in this case, let it be further assumed, is of the synchronous type with a polarized armature, are so connected with the conductors of the generator G that said disk rotates clockwise and that under these conditions the binding-posts $d'$ $d^2$ $e'$ $e^2$ are connected with the conductors 1 2 3 in the manner shown. Now to adjust the scale $h\,i$, Figs. 4 and 5, assume for the present that the binding-posts of the motor, which drives the target-disk A' of said apparatus and which is likewise of the synchronous type with a polarized armature, have no connection with the conductors 1' 2' 3' of the generator G', although they are shown so connected in Fig. 6, but that said binding-posts $d^3$ $d^4$ $e^3$ $e^4$ are connected, respectively, with the binding-posts $e'$ $e^2$ $d'$ $d^2$, and hence with the conductors 1 2 3 of the generator G, and that when so connected the target-disk A' rotates counter-clockwise. Under the foregoing conditions, the motors of the apparatus rotating in synchronism with the generator G, and thus in synchronism with one another, and therefore the stroboscopic disks rotating in opposite directions at the same speed, four stationary images $m$ $m$ $m$ $m$, substantially similar in appearance to the spots on the target-disks and due to the periodical view of the spots obtained through the slots and to persistence of vision, will be seen arranged substantially one-quarter circumference apart. The scale $h$ $i$ is then adjusted by placing its zero-line opposite one of said images. After the scale $h$ $i$ has been adjusted, as aforesaid, and to arrange the apparatus for use as an indicator disconnect the binding-posts $d^3$ $d^4$ $e^3$ $e^4$ from the binding-posts $e'$ $e^2$ $d'$ $d^2$ and connect $d^3$ $d^4$ $e^3$ $e^4$ with the conductors 1' 2' 3' of the generator G' in the manner shown in Fig. 6, the binding-posts $e'$ $e^2$ $d'$ $d^2$ remaining connected with the conductors 1 2 3 of the generator G in the manner before described. Then the motor operated by the generator G will drive the shutter-disk A clockwise, as before, and the motor which drives the target-disk A' will be operated by the generator G' and rotate said disk counter-clockwise. Now with the generator G running at normal speed and the incoming generator G' gradually working up to synchronism therewith and the motors which drive the shutter and target disks in synchronism with G and G', respectively, images of the spots on the target-disk will be seen, said images varying in number, distance apart, and direction of rotation as the speed of the incoming generator increases until it approaches synchronism with the other generator. At this time only four images will appear substantially one-quarter circumference apart or three hundred and sixty degrees apart on the scale $h$ $i$ and not more than one image inside the limits of said scale $i$ at the same time. These images will rotate clockwise, the rate of rotation diminishing as the approach to synchronism becomes closer, and finally becoming zero—that is to say, the images become stationary—at synchronism, said rotation being again resumed, however, if synchronism is not maintained and in the counter-clockwise direction should the speed of the generator G' for any reason be increased until greater than the speed of the generator G'. It is evident, therefore, that if it is only necessary that the incoming generator should be in synchronism, or substantially so, with the other generator before closing the switch S' the facts that the four images are seen, as described, and that they are either stationary or slowly rotating serve to indicate when the switch S' may be safely closed and the incoming generator thus connected with the work-circuit, while the fact that said four images are rotating clockwise or counter-clockwise, as the case may be, serves as an indication whereby the speed of the incoming generator may be increased or decreased so as to bring it toward and into synchronism with the other generator. The scales $h$ $i$ being adjusted, as before described, when the incoming generator G' is in synchronism with the generator G, and therefore four stationary images appear one-quarter circumference apart, one of which is inside the limits of the scale $i$, as aforesaid, the position of said image if on the right of the zero-line indicates the amount by which the two-phase electromotive forces of the generator G lead ahead of opposition the two-phase electromotive forces of the generator G', as read on the scale $i$, while if said image is on the left of the zero-line the lag-behind opposition of said electromotive forces of the generator G behind said electromotive forces of the generator G' is shown. In other words, the degree to which the incoming generator is out of step with the system, either ahead or behind, is shown, and thus the apparatus serves as an indicator not only of when the incoming generator is in synchronism with the other generator, but also of when the phase relations of the electromotive forces of the two generators are such as to permit the incoming generator to be connected with the work-circuit without causing undesirable electrical fluctuations in the system when conditions make such indication neessary or desirable.

In the form of apparatus embodying my invention, which has been hereinbefore described, each of the motors for driving the stroboscopic disks has four poles; but obviously said motors may have any number of poles suitable for obtaining a practicable speed for such motors with currents of such frequency as are to be employed to energize them, and preferably if each of such motors in my apparatus has $2\,n$ number of poles the target-disk should have $n$ spots or objects and the shutter-disk should have $n$ slots, said spots and slots respectively being at equi-angular distances apart. The scale $h$, reading to three hundred and sixty degrees on either side of the central or zero line, should embrace the $\frac{1}{n}$th part of the circumference of a circle. The scale $i$, reading to one hundred and eighty degrees on either side of said central or zero line, should embrace the $\frac{1}{2}n$th part of the circumference of a circle, and when the motors are in synchronism with one another, or nearly so, $2\,n$ images substantially the $\frac{1}{2}n$th part of the circumference of a circle apart will be seen, and therefore said images will be substantially three hundred and sixty degrees apart, as read on the scale $h$, and only one image will be seen inside the limits of the scale $i$ at the same time. Although I have just stated the preferred relations which the spots and slots of the stroboscopic disks and dimensions of the scale $h$ $i$ may bear to the number of poles in each of the motors in my apparatus, other relations between them may be had.

The divisions on the scale may be at equal intervals apart, or the position that each division should have may be determined by operating the apparatus under electrical conditions of variable but known phase relations, as necessity may require—that is to say, the divisions may be equally spaced if so doing will produce a sufficiently-accurate scale, or, if necessary for proper accuracy, the positions of the divisions may be experimentally determined.

When the apparatus is intended to indicate frequency relations and not phase relations, in some cases no scale may be required—for example, in the case where the number of images at or near synchronism of the two motors in the apparatus is not so great but that the number of images and their distance apart can be determined with sufficient accuracy with the eye alone.

Although the most perfect embodiment of my invention is that which I have described as having polarized armatures, such armatures in the motors of the apparatus are not required when it is intended to indicate only frequency relations and not phase relations. In such case any suitable non-polarized form of armatures may be employed, and induction-armatures adapted to operate nearly at synchronous speed might be used in the motors of the apparatus if conditions are such that only an approximate indication of the approach of an incoming generator to synchronism with the other generator connected with a system is necessary.

The stroboscopic disks hereinbefore described are a convenient means for getting the stroboscopic effect or images of rotating spots or objects; but other forms of stroboscopic disks and also other means than such disks may be substituted therefor in my apparatus, if desired.

When the apparatus is used with a single-phase system, only one winding on each field-magnet is required, the two motors in the apparatus being then single-phase motors and requiring to be started in opposite directions by external means. When after being started said motors are running each substantially in synchronism with the one of the two single-phase generators with which respectively they are connected, the apparatus will furnish indications substantially as does the apparatus with two-phase motors in a two-phase system, as hereinbefore fully described.

The apparatus with single-phase motors just described may also be used with a multiphase system for furnishing the indications before referred to. For example, if such apparatus is used with the two-phase system illustrated in Fig. 6 of the drawings the motor driving the shutter-disk would have only two binding-posts for its single winding—say $e^2$ $e'$—connected, respectively, with the common return-conductor 3 and an outgoing conductor 1, as shown, and the motor driving the target-disk would also have only two binding-posts—say $d^4$ $d^3$—connected, respectively, with the common return-conductor 3' and an outgoing conductor 1', as shown, said conductors 1 1' being those in which are set up the leading electromotive forces of the two-phase generators G G', respectively, and there being no direct connection of the apparatus with the outgoing conductors 2 2', as it is assumed in this case that the binding-posts $d'$ $d^2$ $e^3$ $e^4$ and their connections with the conductors are omitted, and no such binding-posts and connections would be called for with single-phase motors employed in the apparatus.

It is obvious in case the electromotive forces of the generators are so high as to make it impracticable to adapt the apparatus for direct connection with said generators that the connection may be made through transformers, which reduce the potential upon the apparatus.

I make no claim in the present application to the feature of the scale in connection with my apparatus shown in this application, since that feature is claimed in my application Serial No. 23,100, filed July 10, 1900.

What I claim is—

1. In an electrical indicating apparatus, the combination of a stroboscopic system having independent elements and means actuated by alternating currents for independently operating said elements.

2. In an electrical indicating apparatus, the combination of an alternating-current motor and an object rotated thereby and means independently actuated by alternating currents for causing said object to be periodically visible.

3. In an electrical indicating apparatus, the combination of two alternating-current motors and means for producing optical images, said means having its elements independently operated by said motors.

4. In an electrical indicating apparatus, the combination of a plurality of alternating-current motors and means for producing stroboscopic images operated thereby.

5. In an electrical indicating apparatus the combination of two synchronous alternating-current motors and means for producing stroboscopic images operated thereby, said motors having terminals whereby they can be connected to conductors supplying alternating currents.

6. In an indicator for electrical apparatus, the combination of alternating-current motors and stroboscopic disks driven by said motors.

7. The combination in an indicating apparatus of a shutter-disk, an alternating-current motor for rotating said shutter-disk in one direction, a target-disk, and a second alternating-current motor for rotating said target-disk in the opposite direction.

8. The combination with two alternating-current generators, of two alternating-current motors, each energized by one of said generators, and means for producing stroboscopic images operated by said motors.

CHARLES L. CLARKE.

Witnesses:
LILLIE VREELAND,
J. B. BASSETT.